(12) United States Patent
Naitou et al.

(10) Patent No.: US 9,850,554 B2
(45) Date of Patent: *Dec. 26, 2017

(54) HOT-PRESS FORMED PRODUCT AND METHOD FOR MANUFACTURING SAME

(71) Applicant: Kobe Steel, Ltd., Kobe-shi (JP)

(72) Inventors: Junya Naitou, Kobe (JP); Toshio Murakami, Kobe (JP); Shushi Ikeda, Nagoya (JP); Keisuke Okita, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 561 days.

This patent is subject to a terminal disclaimer.

(21) Appl. No.: 14/373,965

(22) PCT Filed: Mar. 15, 2013

(86) PCT No.: PCT/JP2013/057469
§ 371 (c)(1),
(2) Date: Jul. 23, 2014

(87) PCT Pub. No.: WO2013/137454
PCT Pub. Date: Sep. 19, 2013

(65) Prior Publication Data
US 2014/0367002 A1     Dec. 18, 2014

(30) Foreign Application Priority Data

Mar. 15, 2012    (JP) ................................ 2012-059448

(51) Int. Cl.
*C21D 8/02*     (2006.01)
*C22C 38/28*     (2006.01)
(Continued)

(52) U.S. Cl.
CPC ........... *C21D 8/0247* (2013.01); *C21D 1/673* (2013.01); *C21D 8/005* (2013.01); *C21D 8/0221* (2013.01);
(Continued)

(58) Field of Classification Search
CPC ...... C21D 1/18; C21D 9/00; C21D 2211/008; C21D 2211/001; C21D 1/673; C21D 8/0494; B21D 22/20
(Continued)

(56) References Cited

U.S. PATENT DOCUMENTS

| 2004/0060623 A1 | 4/2004 | Boke et al. |
| 2012/0006089 A1* | 1/2012 | Pohl ............... C21D 1/673 72/364 |
| 2013/0048161 A1 | 2/2013 | Matsuda et al. |

FOREIGN PATENT DOCUMENTS

| CN | 102304612 A | 1/2012 |
| JP | 2006-213959 | 8/2006 |

(Continued)

OTHER PUBLICATIONS

Ebrahim Najafi Birgani and Majid Pouranvari Effect of Martensite Volume Fraction on the Work Hardening Behavior of Dual Phase Steels 19.-21. 5. 2008, Hradec nad Moravici.*

(Continued)

*Primary Examiner* — Jenny Wu
(74) *Attorney, Agent, or Firm* — Oblon, McClelland, Maier & Neustadt, L.L.P.

(57) ABSTRACT

A hot-press formed product can be achieved which has regions corresponding to a shock resistant portion and an energy absorption portion within a single formed product without applying a welding method and achieves the balance of high strength and elongation with a high level according to each region by means of having a first forming region exhibiting a metal structure containing martensite: 80-97 area % and retained austenite: 3-20 area % respectively, the remaining structure being 5 area % or less, and a second forming region exhibiting a metal structure containing annealed martensite or annealed bainite: 30-97 area %, (Continued)

martensite as quenched: 0-67 area %, and retained austenite: 3-20 area %.

14 Claims, 2 Drawing Sheets

(51) Int. Cl.
  C22C 38/06 (2006.01)
  C22C 38/00 (2006.01)
  C22C 38/02 (2006.01)
  C22C 38/04 (2006.01)
  C21D 8/00 (2006.01)
  C22C 38/32 (2006.01)
  C21D 1/673 (2006.01)
  C21D 1/18 (2006.01)
  B21D 22/20 (2006.01)
  B62D 29/00 (2006.01)

(52) U.S. Cl.
  CPC ............ *C22C 38/001* (2013.01); *C22C 38/02* (2013.01); *C22C 38/04* (2013.01); *C22C 38/06* (2013.01); *C22C 38/28* (2013.01); *C22C 38/32* (2013.01); *B21D 22/208* (2013.01); *B62D 29/007* (2013.01); *C21D 1/18* (2013.01); *C21D 2211/001* (2013.01); *C21D 2211/002* (2013.01); *C21D 2211/008* (2013.01); *C21D 2221/00* (2013.01)

(58) Field of Classification Search
  USPC .................................. 148/639, 647, 649, 654
  See application file for complete search history.

(56) References Cited

FOREIGN PATENT DOCUMENTS

| JP | 2012-41613 | 3/2012 |
| WO | 2011/111333 A1 | 9/2011 |
| WO | 2012/147963 A1 | 11/2012 |
| WO | 2012/169640 A1 | 12/2012 |

OTHER PUBLICATIONS

International Search Report and Written Opinion of the International Searching Authority issued Jun. 18, 2013, in PCT/JP2013/057469, filed Mar. 15, 2013.

K. Lamprecht, et al., "Thermo-Mechanical Properties of Tailor Welded Blanks in Hot Sheet Metal Forming Processes", Proc. I DDRG, 2010, 12 pages.

"Usibora®, 1500P and Ductibor® 500P", Arcelormittal, Tailored Blanks, http://automotive.arcelormittal.com/tailoredblanks/pre/seifware.pl, 1 page.

Rüdiger Erhardt, et al., "Industrial application of hot forming process simulation", Proc. of $1^{st}$ Int. Conf. on Hot Sheet Metal Forming of High-Performance Steer, Ed., Process Design 1, Steel Grips, vol. 6, Suppl. CHS2, 2008, pp. 83-88.

Begoña Casas, et al., "Tailor made tool materials for the present and upcoming tooling solutions in hot sheet metal forming", Proc. of $1^{st}$ Int. Conf. on Hot Sheet Metal Forming of High-Performance Steer, Ed., Materials 1, Streel Grips, vol. 6, Suppl. CHS2, 2008, pp. 23-35.

\* cited by examiner

(UNIT: mm)

(b)

(UNIT: mm)

HOT-PRESS FORMED PRODUCT AND METHOD FOR MANUFACTURING SAME

TECHNICAL FIELD

The present invention relates to a hot-press formed product used for structural members of automobile components and capable of adjusting the strength and ductility according to different regions within the formed product and a method for manufacturing the same, and relates more specifically to a hot-press formed product being subjected to a heat treatment simultaneously with impartation of the shape in forming a pre-heated steel sheet (blank) into a predetermined shape and capable of obtaining the strength and ductility according to different regions and a useful method for manufacturing such hot-press formed product.

BACKGROUND ART

As one of the fuel economy improvement measures of an automobile triggered by global environment problems, weight reduction of the vehicle body is advancing, and it is necessary to high-strengthen a steel sheet used for an automobile as much as possible. However, when a steel sheet is high-strengthened for weight reduction of an automobile, elongation EL and r value (Lankford value) drop, and press formability and shape freezing property come to deteriorate.

In order to solve such problems, a hot-press forming method has been employed for manufacturing components in which a steel sheet is heated to a predetermined temperature (for example, a temperature at which a state of an austenitic phase is achieved), the strength is lowered (that is, forming is facilitated), the steel sheet is thereafter formed using a tool of a temperature (room temperature for example) that is lower compared with the case of a thin steel sheet, thereby impartation of a shape and a rapid heat treatment (quenching) utilizing the temperature difference of the both are executed simultaneously, and the strength after forming is secured.

According to such hot-press forming method, because forming is executed in a low strength state, spring back is also reduced (shape freezing property is excellent), a material added with alloy elements such as Mn, B and the like and having excellent quenchability is used, and thereby the strength of 1,500 MPa class in terms of the tensile strength is obtained by rapid cooling. Also, such hot-press forming method is referred to by various names such as a hot forming method, hot stamping method, hot stamp method, die quench method, and the like in addition to the hot-press method.

Figure 1:
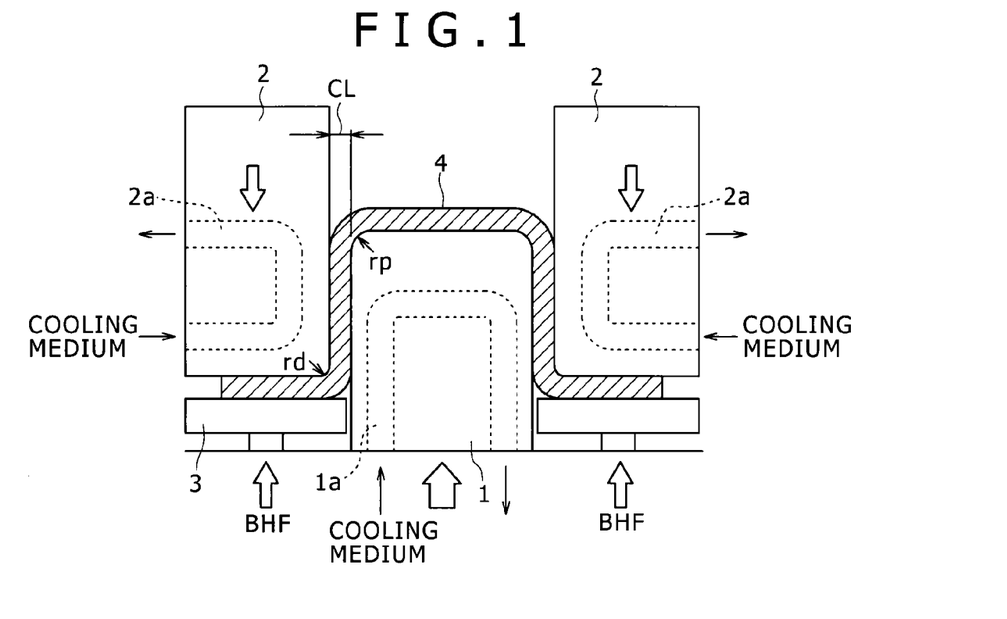
FIG. 1 is a schematic explanatory drawing showing a tool configuration for executing hot-press forming.

FIG. 1 is a schematic explanatory drawing showing a tool configuration for executing above-mentioned hot-press forming (may be hereinafter represented by "hot stamp"), 1 in the drawing is a punch, 2 is a die, 3 is a blank holder, 4 is a steel sheet (blank), BHF is a blank holding force, rp is punch shoulder radius, rd is die shoulder radius, and CL is punch/die clearance respectively. Also, out of these components, in the punch 1 and the die 2, passages 1a, 2a through which a cooling medium (water for example) can pass are formed inside of each, and it is configured that these members are cooled by making the cooling medium pass through these passages.

In hot stamping (hot deep drawing for example) using such tool, forming is started in a state the steel sheet (blank) 4 is heated to a single-phase zone temperature of $Ac_3$ transformation point or above and is softened. That is, in a state the steel sheet 4 in a high temperature state is sandwiched between the die 2 and the blank holder 3, the steel sheet 4 is pressed in to the inside of a hole of the die 2 (between 2, 2 of FIG. 1) by the punch 1, and is formed into a shape corresponding to the shape of the outer shape of the punch 1 while reducing the outside diameter of the steel sheet 4. Also, by cooling the punch 1 and the die 2 in parallel with forming, heat removal from the steel sheet 4 to the tools (the punch 1 and the die 2) is executed, holding and cooling are further executed at a forming bottom dead point (the temporal point the tip of the punch is positioned at the deepest point: the state shown in FIG. 1), and thereby quenching of the raw material is executed. By executing such forming method, a formed product of 1,500 MPa class with excellent dimensional accuracy can be obtained, the forming load can be reduced compared with a case a component of a same strength class is cold-formed, and therefore less capacity of the press machine is needed.

As a steel sheet for hot stamping widely used at present, one using 22Mn—B5 steel as a raw material is known. The steel sheet has the tensile strength of approximately 1,500 MPa and the elongation of approximately 6-8%, and is applied to a shock resistant member (a member not causing deformation as much as possible and not causing breakage in collision). Further, development of further high-strengthening (1,500 MPa or more, 1,800 MPa class) is also advancing by increasing the C content on the base of 22Mn—B5 steel.

However, the present situation is that a steel king other than 22Mn—B5 steel is scarcely applied, and a steel kind and a manufacturing method for controlling the strength and elongation of the component (for example, lowering the strength: 980 MPa class, elongation increasing: 20%, and the like) and widening the application range to other than shock resistant members are scarcely studied.

In a passenger car of the middle class or more, there is a case that both functions of a shock resistant portion and an energy absorption portion are secured within a component such as a B-pillar, rear side member, front side member and the like considering the compatibility in a side collision and a rear collision (a function for protecting the counterpart side also when a small-sized car collides with). In manufacturing the members described above, a method of laser-welding a high strength super high-ten of 980 MPa class and a ductile high-ten of 440 MPa class (tailored weld blank: TWB) for example and press-forming in a cold state has been a mainstream. However, recently, development of a technology for separately achieving the strength within a component by hot stamping is advancing.

For example, in non-patent literature 1, a method for hot stamping is proposed in which 22Mn—B5 steel for hot stamping and a material not achieving high strength even by quenching using a tool are laser-welded (tailored weld blank: TWB), and the tensile strength: 1,500 MPa (elongation: 6-8%) on the high strength side (shock resistant portion side) and the tensile strength: 440 MPa (elongation: 12%) on the low strength side (energy absorption portion side) are separately achieved. From a similar viewpoint, such technology as non-patent literature 2 has been proposed.

According to the technology of the non-patent literatures 1, 2, although the tensile strength is 600 MPa or less and the elongation is approximately 12-18% on the energy absorption portion side, laser-welding (tailored weld blank: TWB) is required beforehand, the number of the manufacturing steps increase, and the cost rises. Further, the energy absorption portion for which quenching is not required essentially comes to be heated which is not preferable from the viewpoint of calorie consumption also.

Furthermore, as a technology for separately achieving the strength within a component, such technologies as non-patent literatures 3, 4 for example have also been proposed. Out of them, according to the technology of the non-patent literature 3, the strength is separately achieved by making a blank a temperature difference (distribution) in a blank within a heating furnace, although 22Mn—B5 steel is a base, due to the effect of adding boron, the robust characteristic of the strength after quenching is inferior with respect to heating to a two-phase zone temperature, strength control on the energy absorption portion side is hard, and the elongation is only approximately 15%.

On the other hand, according to the technology of the non-patent literature 4, although the strength is separately achieved by changing the cooling rate within a tool (by heating a part of the tool by a heater, or by using materials with different thermal conductivity), 22Mn—B5 steel is a base, which is not rational in that the 22Mn—B5 steel which essentially has excellent quenchability is controlled so as not to be quenched (tool cooling control).

CITATION LIST

Non-Patent Literature

Non-Patent Literature 1: Klaus Lamprecht, Gunter Deinzer, Anton Stich, Jurgen Lechler, Thomas Stohr, Marion Merklein, "Thermo-Mechanical Properties of Tailor Welded Blanks in Hot Sheet Metal Forming Processes", Proc. IDDRG2010, 2010.
Non-Patent Literature 2: Usibor1500P (22MnB5)/1500 MPa·8%-Ductibor500/550-700 MPa·17% (retrieved on Apr. 27, 2011) on internet <http://www.arcelomittal.com/tailoredblanks/pre/seifware.pl>
Non-Patent Literature 3: 22MnB5/above AC3/1500 MPa·8%-below AC3/Hv190·Ferrite/Cementite Rudiger Erhardt and Johannes Boke, "Industrial application of hot forming process simulation", Proc, of 1st Int. Conf. on Hot Sheet Metal Forming of High-Performance steel, ed. By Steinhoff, K., Oldenburg, M, Steinhoff, and Prakash, B., pp 83-88, 2008.
Non-Patent Literature 4: Begona Casas, David Latre, Noemi Rodriguez, and Isaac Valls, "Tailor made tool materials for the present and upcoming tooling solutions in hot sheet metal forming", Proc, of 1st Int. Conf. on Hot Sheet Metal Forming of High-Performance steel, ed. By Steinhoff, K., Oldenburg, M, Steinhoff, and Prakash, B., pp 23-35, 2008.

SUMMARY OF INVENTION

Technical Problems

The present invention has been developed in view of such circumstances as described above, and its object is to provide a hot-press formed product having regions equivalent to a shock resistant portion and an energy absorption portion within a single formed product and capable of achieving a balance of high strength and elongation with a high level according to each region without applying a welding method, and a useful method for manufacturing such the hot-press formed product.

Solution to Problems

The hot-press formed product of the present invention that could achieve the object described above is a hot-press formed product obtained by forming a thin steel sheet by a hot-press forming method including a first forming region exhibiting a metal structure containing martensite: 80-97 area % and retained austenite: 3-20 area % respectively, the remaining structure being 5 area % or less, and a second forming region exhibiting a metal structure containing annealed martensite or annealed bainite: 30-97 area %, martensite as quenched: 0-67 area %, and retained austenite: 3-20 area %.

In the hot-press formed product of the present invention, although the chemical component composition thereof is not limited, the first forming region and the second forming region for example have a same chemical component composition, and a steel of each formed region containing C: 0.1-0.3% (means mass %, hereinafter the same with respect to the chemical component composition), Si: 0.5-3%, Mn: 0.5-2%, P: 0.05% or less (exclusive of 0%), S: 0.05% or less (exclusive of 0%), Al: 0.01-0.1%, and N: 0.001-0.01% respectively, with the remainder consisting of iron and inevitable impurities, can be cited.

In the hot-press formed product of the present invention, according to the necessity, it is also useful that the steel further contains, as other elements, (a) B: 0.01% or less (exclusive of 0%) and Ti: 0.1% or less (exclusive of 0%), (b) at least one element selected from the group consisting of Cu, Ni, Cr and Mo: 1% or less (exclusive of 0%) in total, and (c) V and/or Nb: 0.1% or less (exclusive of 0%) in total, and the like, and the property of the hot-press formed product is further improved according to the kind of the contained elements.

The method of the present invention has a gist in a point of a method for manufacturing the hot-press formed product as described above by forming a thin steel sheet separatedly to a plurality of regions including at least first and second regions, including the steps of using the thin steel sheet having a metal structure with 80 area % or more of martensite or bainite, heating the thin steel sheet by a heating step that simultaneously executes a plurality of heating treatments including a first heating treatment for heating the first forming region to a temperature of $Ac_3$ transformation point or above and 1,000° C. or below and a second heating treatment for heating the second forming region to a temperature of $Ac_1$ transformation point or above and ($Ac_1$ transformation point×0.2+$Ac_3$ transformation point×0.8) or below, thereafter starting cooling with an average cooling rate of 20° C./s or more and forming by pressing jointly using a tool at least for the first forming region and the second forming region, and finishing forming at a temperature or below, the temperature being lower than a martensitic transformation starting point by 50° C.

Further, the method of the present invention also has a gist in a point of a method for manufacturing the hot-press formed product as described above by forming a thin steel sheet separatedly to a plurality of regions including at least first and second regions, including the steps of heating the thin steel sheet by a heating step that simultaneously executes a plurality of heating treatments including a first heating treatment for heating the first forming region to a temperature of $Ac_1$ transformation point or above and 1,000° C. or below and a second heating treatment for heating the second forming region to a temperature of $Ac_1$ transformation point or above and ($Ac_1$ transformation point×0.2+$Ac_3$ transformation point×0.8) or below, thereafter starting cooling with an average cooling rate of 20° C./s or more and forming by pressing jointly using a tool at least for the first forming region and the second forming region, and finishing forming at a temperature or below, the temperature being lower than a martensitic transformation starting point by 50° C.

Advantageous Effects of Invention

According to the present invention, in the hot-press forming method, by properly controlling the conditions thereof according to each region of the formed product, the metal structure of each region can be adjusted while making retained austenite of a proper amount exist, the hot-press formed product whose ductility inherent in the formed product (residual ductility) is increased more than the case conventional 22Mn-5B steel is used can be achieved, and the strength and elongation can be properly controlled according to each region by combination of the heat treatment condition and the structure of the steel sheet before forming (initial structure).

DESCRIPTION OF EMBODIMENTS

The present inventors carried out studies from various aspects in order to achieve such a hot-press formed product that showed excellent ductility (elongation) while securing the strength matching the required properties of respective different regions after forming in heating a thin steel sheet to a predetermined temperature and thereafter manufacturing the formed product by hot-press forming.

As a result of the studies, it was found out that, in manufacturing a hot-press formed product by press-forming a thin steel sheet using a press forming tool, when the heating temperature and the conditions of respective forming regions in forming were properly controlled and the structure of the each forming region was adjusted so as to contain retained austenite by 3-20 area %, a hot-press formed product exerting strength-ductility balance according to each forming region could be achieved, and the present invention was completed.

The reasons for setting the range of the structure (basic structure) in each forming region of the hot-press formed product of the present invention are as follows.

(1) Structure of First Forming Region

By making the main structure of the first forming region martensite of high strength, high strength of a specific region in the hot-press formed product can be secured. From such viewpoint, it is necessary to make the area fraction of martensite 80 area % or more. However, when this fraction exceeds 97 area %, the fraction of the retained austenite becomes insufficient, and ductility (residual ductility) drops. Preferable lower limit of the martensite fraction is 83 area % or more (more preferably 85 area % or more), and preferable upper limit is 95 area % or less (more preferably 93 area % or less).

Retained austenite has effects of increasing the work hardening rate (transformation induced plasticity) by being transformed into martensite during plastic deformation and improving the ductility of the formed product. In order to exert such effects, it is necessary to make the fraction of the retained austenite 3 area % or more. Although ductility becomes more excellent as the fraction of the retained austenite is more, in the composition used for steel sheets for automobile, securable retained austenite is limited, and approximately 20 area % is the upper limit. Preferable lower limit of the retained austenite is 5 area % or more (more preferably 7 area % or more).

With respect to the structure other than the above, although ferrite, pearlite, bainite and the like can be contained as the remaining structure, these structures are structures softer than martensite, contribution to the strength is less compared to other structures, and it is preferable to be as little as possible. However, up to 5 area % is allowable. The remaining structure is more preferably 3 area % or less, and is even more preferably 0 area %.

By preparing the structure of the first forming region as described above, a portion with 1,470 MPa or more of the strength (tensile strength TS) and 10% or more of the elongation (total elongation EL) (for example a shock resistant portion of an automobile component) can be formed.

(2) Structure of Second Forming Region

By making the main structure of the second forming region annealed martensite or annealed bainite fine in size and low in dislocation density, ductility (elongation) of the hot-press formed product can be increased while securing a predetermined strength. From such viewpoint, it is preferable to make the area fraction of annealed martensite or annealed bainite 30 area % or more. However, when this fraction exceeds 97 area %, the fraction of retained austenite becomes insufficient, and ductility (residual ductility) drops. More preferable lower limit of the fraction of annealed martensite or annealed bainite is 40 area % or more (more preferably 50 area % or more), and more preferable upper limit is less than 90 area % (more preferably less than 80 area %).

Since martensite as quenched is a structure poor in ductility, when it is present in a large amount, the strength becomes too high and the elongation is deteriorated, and therefore it may be 0 area %. However, it is a very effective structure in increasing the strength, presence of a proper amount is permissible. From such viewpoint, it is preferable that the fraction of martensite as quenched is made 67 area % or less. More preferable upper limit of the fraction of martensite as quenched is 60 area % or less (more preferably 50 area % or less).

Due to the reasons similar to those for the first forming region, the fraction of the retained austenite is to be 3 area % or more and 20 area % or less. Preferable lower limit of the retained austenite is also similar.

In addition to the structure described above, ferrite, pearlite, bainite and the like can be contained as a residual structure, these structures are inferior in contribution to the strength and contribution to the ductility compared to other structures, and it is preferable basically not to contain them (it may also be 0 area %). However, up to 20 area % is permissible. The residual structure is more preferably 10 area % or less, and more preferably 5 area % or less.

By preparing the structure of the second forming region as described above, a portion with 980 MPa or more of the strength (tensile strength TS) and 15% or more of the elongation (total elongation EL) (for example an energy absorption portion of an automobile component) can be formed.

Although the formed product of the present invention includes at least the first forming region and the second forming region, it is not necessarily limited to two forming regions, and a third or fourth forming region may be included. In forming such forming regions, it is possible to prepare them according to a manufacturing method described below.

The hot-press formed product of the present invention can be manufactured by separating a thin steel sheet (the chemical component composition is same as that of the formed product) into plural regions at least including first and second regions, heating the thin steel sheet by a step that simultaneously executes plural heating treatments including a first heating treatment for heating the first forming region to a temperature of $Ac_3$ transformation point or above and 1,000° C. or below and a second heating treatment for heating the second forming region to $Ac_1$ transformation point or above and a temperature equivalent to ($Ac_1$ transformation point×0.2+$Ac_3$ transformation point×0.8) or below, thereafter starting cooling with an average cooling rate of 20° C./s or more and forming by pressing jointly within a tool at least for the first forming region and the second forming region, and finishing forming at a temperature or below, the temperature being lower than a martensitic transformation starting point by 50° C. (may be hereinafter expressed as "Ms point−50° C."). The reasons why respective requirements in the method are stipulated are as follows. Also, "finishing forming" basically means a state of reaching the bottom dead point of forming (the temporal point the tip of the punch is positioned at the highest part: the state shown in FIG. 1), however, when cooling of the tool to a predetermined temperature in the state is required, the time until the tool is detached after retaining cooling of the tool is also to be included.

According to the method, by separating the heating region of the steel sheet into at least two regions (for example, a high strength side region and a low strength side region) and controlling the manufacturing condition according to each region, such formed product that exerts the strength-ductility balance according to each region is obtained. Manufacturing conditions for forming each condition will be described. Also, in executing this manufacturing method, it is required to form regions with different heating temperatures by a single steel sheet. However, by using an existing heating furnace (for example, far infrared furnace, electric furnace+shield), controlling while making the boundary section of the temperature 50 mm or less is possible.

(Manufacturing Condition of First Forming Region (High Strength Side Region))

In order to properly adjust the structure of the hot-press formed product, it is necessary to control the heating temperature to a predetermined range. By properly controlling the heating temperature (first heating treatment), in the cooling step thereafter, the first forming region is transformed to a structure mainly of martensite while securing retained austenite of a predetermined amount, and can be formed into a desired structure in the final hot-press formed product. When the heating temperature of the thin steel sheet is below $Ac_3$ transformation point, a sufficient amount of austenite cannot be obtained in heating, and retained austenite of a predetermined amount cannot be secured in the final structure (the structure of the formed product). Also, when the heating temperature of the thin steel sheet exceeds 1,000° C., the grain size of austenite becomes large in heating, the martensite transformation starting temperature (Ms point) and the martensite transformation finishing temperature (Mf point) rise, retained austenite cannot be secured in quenching, and excellent formability is not achieved. The heating temperature is preferably (Acs transformation point+50° C.) or above, and 950° C. or below.

It is necessary to properly control the cooling condition during forming and the forming finishing temperature according to each region. In the steel sheet region corresponding to the first forming region of the formed product (this region may be referred to as "the first steel sheet region"), it is necessary to finish forming at a temperature equivalent to (Ms point−50° C.) or below while securing the average cooling rate of 20° C./s or more inside the tool.

In order to make austenite formed in the heating step described above a desired structure (a structure mainly of martensite) while preventing formation of a structure such as ferrite, pearlite, bainite and the like, it is necessary to properly control the average cooling rate during forming and the forming finishing temperature. From such viewpoint, the average cooling rate during forming is made 20° C./s or more and the forming finishing temperature is made (Ms point−50° C.) or below. Particularly, when a steel sheet with high Si content is made an object, by executing cooling with such condition, the mixture structure of martensite and retained austenite can be achieved. The average cooling rate during forming is preferably 30° C./s or more (more preferably 40° C./s or more).

With respect to the forming finishing temperature in the first steel sheet region, although forming may be finished while executing cooling with the average cooling rate described above to the room temperature, it is also possible to execute cooling to (Ms point−50° C.) or below (preferably to a temperature of Ms point−50° C.), and to execute cooling thereafter with the average cooling rate of 20° C./s or less to 200° C. or below (two stage cooling). By adding such cooling step and concentration of carbon in martensite to untransformed austenite, the amount of retained austenite can be increased. The average cooling rate in cooling of the second stage in such two stage cooling is preferably 10° C./s or less, (more preferably 5° C./s or less).

(Manufacturing Condition of Second Forming Region (Low Strength Side Region))

On the other hand, in a steel sheet region corresponding to the second forming region of the formed product (this region may be referred to as (the second steel sheet region"), it is necessary to control the heating temperature to a predetermined range in order to partially transform martensite and bainite included in the thin steel sheet while annealing. By properly controlling this heating temperature (the second heating treatment), in the cooling step thereafter, it is possible to cause transformation to retained austenite or martensite and to achieve a desired structure in the final hot-press formed product. When the heating temperature of the second steel sheet region is below $Ac_1$ transformation point, austenite of a sufficient amount cannot be obtained in heating, and retained austenite of a predetermined amount cannot be secured in the final structure (the structure of the formed product). Also, when the heating temperature of the second steel sheet region exceeds ($Ac_1$ transformation point×0.2+$Ac_3$ transformation point×0.8), the transformation amount to austenite increases too much in heating, annealed martensite and annealed bainite of a predetermined amount cannot be secured in the final structure (the structure of the formed product). The heating temperature is preferably ($Ac_1$ transformation point+50° C.) or above and a temperature equivalent to ($Ac_1$ transformation point×0.3+$Ac_3$ transformation point×0.7) or below.

In order to make austenite formed in the heating step described above a desired structure while preventing formation of a structure such as ferrite, pearlite, bainite and the like, it is necessary to properly control the average cooling rate during forming and the forming finishing temperature in the second steel sheet region. From such viewpoint, it is preferable that the average cooling rate during forming is made 20° C./s or more and the forming finishing temperature is made 200° C. or below. The average cooling rate during forming is more preferably 30° C./s or more (more preferably 40° C./s or more). Also, with respect to the forming finishing temperature, although forming may be finished while executing cooling with the average cooling rate described above to the room temperature, it is also possible to finish forming after executing cooling to (Ms point−50° C.) or below.

In considering the manufacturing step in the second steel sheet region, with respect to the structure of the steel sheet used in manufacturing, it is preferable to use a thin steel sheet (cold rolled steel sheet) with 80 area % or more of martensite or bainite. That is, in order to secure a proper amount of annealed martensite and annealed bainite which are fine in size and largely contributing to ductility in the heating step thereafter (heating, hot-press forming, and cooling), it is preferable to use a thin steel sheet with 80 area % or more of the fraction of martensite or bainite. When this fraction becomes less than 80 area %, not only that a proper amount of annealed martensite and annealed bainite cannot be secured in the structure of the formed product, the fraction of other structure (ferrite for example) is increased, and the strength-ductility balance comes to be deteriorated. Preferable lower limit of this fraction for both is 90 area % or more (more preferably 95 area % or more). Also, even when a thin steel sheet with such structure is used, the first region is not affected.

The average cooling rate during forming can be controlled by means such as (a) controlling the temperature of the forming tool (the cooling medium shown in FIG. 1 above) and (b) controlling the thermal conductivity of the tool). Also, in the method of the present invention, although the cooling condition during forming differs according to each steel sheet region, cooling control according to each steel sheet region can be executed within a single tool by separately forming the control means such as (a) and (b) above within a single tool.

The method for manufacturing the hot-press formed product of the present invention can be applied not only to a case of manufacturing a hot-press formed product with such simple shape as shown in FIG. 1 above (direct method) but also to a case of manufacturing a formed product with a comparatively complicated shape. However, in the case of a complicated component shape, forming to the final shape of the product by press forming of one time may occasionally be hard. In such case, a method of executing cold-press forming in a step before hot-press forming (this method is called "indirect method") can be employed. In this method, a portion whose forming is difficult is formed beforehand to an approximated shape by cold working, and the other portion is hot-press formed. When such method is employed, in forming such component that the formed product has three unevennesses (mountain sections) for example, up to two portions are formed by cold-press forming, and the third portion comes to be formed by hot-press formed thereafter.

The present invention was developed with the hot-press formed product formed of a high-strength steel sheet in mind, and the steel kind thereof may be of an ordinary chemical component composition as a high-strength steel sheet. However, with respect to C, Si, Mn, P, S, Al and Ni, it is advisable to be adjusted to a proper range. From such viewpoint, a preferable range of these chemical compositions and reasons for limiting the range are as follows.

(C: 0.1-0.3%)

C is an important element in securing retained austenite. By being concentrated to austenite in heating to a two phase zone temperature (between $Ac_1$ transformation point and $Ac_3$ transformation point) or to a single phase zone temperature of $Ac_3$ transformation point or above, retained austenite is formed after quenching. Further, C is an important element also in increasing the martensite amount or in controlling the strength of martensite (the first region). When C content is less than 0.1%, a predetermined retained austenite amount cannot be secured, and excellent ductility cannot be obtained. Also, the strength of martensite becomes insufficient. On the other hand, when C content becomes excessive and exceeds 0.3%, the strength becomes too high. Preferable lower limit of C content is 0.15% or more (more preferably 0.20% or more), and preferable upper limit is 0.27% or less (more preferably 0.25% or less).

(Si: 0.5-3%)

Si exerts actions of suppressing austenite after heating to a single phase zone temperature of $Ac_3$ transformation point or above from being formed into cementite, or suppressing austenite after heating to a two phase zone temperature (between $Ac_1$ transformation point and $Ac_3$ transformation point) from being disintegrated to cementite and ferrite, and increasing/forming retained austenite in quenching. Further, Si also exerts an action of increasing strength without greatly deteriorating ductility by solid solution strengthening. When Si content is less than 0.5%, a predetermined retained austenite amount cannot be secured, and excellent ductility is not obtained. Also, when Si content becomes excessive and exceeds 3%, the solid solution strengthening amount excessively increases, and ductility comes to largely deteriorate. Preferable lower limit of Si content is 1.15% or more (more preferably 1.20% or more), and preferable upper limit is 2.7% or less (more preferably 2.5% or less).

(Mn: 0.5-2%)

Mn is an element stabilizing austenite, and contributes to increase of retained austenite. Further, Mn is also an effective element in enhancing quenchability, in suppressing formation of ferrite, pearlite and bainite in cooling after heating, and securing retained austenite. In order to exert such effects, it is preferable to contain Mn by 0.5% or more. Although Mn content is preferable to be as much as possible when only the properties are considered, because the cost for adding alloys increases, 2% or less is preferable. Also, because the strength of austenite is largely improved, the load of hot rolling increases, manufacturing of the steel sheet becomes difficult, and therefore it is also not preferable to contain Mn exceeding 2% from the point of productivity. More preferable lower limit of Mn content is 0.7% or more (more preferably 0.9% or more), and more preferable upper limit is 1.8% or less (more preferably 1.6% or less).

(P: 0.05% or less (exclusive of 0%))

Although P is an element inevitably included in steel, because P deteriorates ductility, P is preferable to be reduced as much as possible. However, because extreme reduction causes an increase of the steel manufacturing cost and to make it 0% is difficult in manufacturing, 0.05% or less (exclusive of 0%) is preferable. More preferable upper limit of P content is 0.045% or less (more preferably 0.040% or less).

(S: 0.05% or less (exclusive of 0%))

Similar to P, S is also an element inevitably included in steel, because S deteriorates ductility, S is preferable to be reduced as much as possible. However, because extreme reduction causes an increase of the steel manufacturing cost and to make it 0% is difficult in manufacturing, 0.05% or less (exclusive of 0%) is preferable. More preferable upper limit of S content is 0.045% or less (more preferably 0.040% or less).

(Al: 0.01-0.1%)

Al is useful as a deoxidizing element, fixes solid-solution N present in steel as AlN, and is useful in improving ductility. In order to effectively exert such effect, Al content is preferably 0.01% or more. However, when Al content becomes excessive and exceeds 0.1%, $Al_2O_3$ is formed excessively, and ductility is deteriorated. Also, more preferable lower limit of Al content is 0.013% or more (more preferably 0.015% or more), and more preferable upper limit is 0.08% or less (more preferably 0.06% or less).

(N: 0.001-0.01%)

N is an element inevitably mixed in and is preferable to be reduced. However, because there is a limit in reducing N in an actual process, 0.001% was made the lower limit. Also, when N content becomes excessive, ductility deteriorates due to strain aging, N precipitates as BN when B is added, quenchability improvement effect by solid-solution B is deteriorated, and therefore the upper limit was made 0.01%. Preferable upper limit of N content is 0.008% or less (more preferably 0.006% or less).

The basic chemical composition in the press formed product of the present invention is as described above, and the remainder is substantially iron. Also, "substantially iron" means that the trace composition (for example, in addition to Mg, Ca, Sr and Ba, REM such as La, carbide forming elements such as Zr, Hf, Ta, W and Mo, and the like of the degree not impeding the properties of the steel sheet of the present invention are also allowable, and inevitable impurities other than P, S, N (for example O, H, and the like) can also be contained in addition to iron.

In the press formed product of the present invention, according to the necessity, it is also useful to further contain (a) B: 0.01% or less (exclusive of 0%) and Ti: 0.1% or less (exclusive of 0%), (b) at least one element selected from the group consisting of Cu, Ni, Cr and Mo: 1% or less (exclusive of 0%) in total, (c) V and/or Nb: 0.1% or less (exclusive of 0%) in total, and the like, and the properties of the hot-press formed product are further improved according to the kind of the elements contained. A preferable range when these elements are contained and reasons for limiting the range are as follows.

(B: 0.01% or less (exclusive of 0%) and Ti: 0.1% or less (exclusive of 0%))

B is an element preventing formation of cementite during cooling after heating and contributing to securing of retained austenite. In order to exert such effects, it is preferable to contain B by 0.0001% or more. However, even when B is contained excessively exceeding 0.01%, the effect saturates. More preferable lower limit of B content is 0.0002% or more (more preferably 0.0005% or more), and more preferable upper limit is 0.008% or less (more preferably 0.005% or less).

On the other hand, Ti produces the improving effect of quenchability by fixing N and maintaining B in a solid solution state. In order to exert such effects, it is preferable to contain Ti by at least four times of N content. However, when Ti content becomes excessive and exceeds 0.1%, TiC is formed in a large amount, and the strength is increased due to precipitation strengthening, although ductility deteriorates. More preferable lower limit of Ti content is 0.05% or more (more preferably 0.06% or more), and more preferable upper limit is 0.09% or less (more preferably 0.08% or less).

(At least one element selected from the group consisting of Cu, Ni, Cr and Mo: 1% or less (exclusive of 0%) in total)

Cu, Ni, Cr and Mo effectively act in preventing formation of cementite in cooling after heating, and in securing retained austenite. In order to exert such effects, it is preferable to contain them by 0.01% or more in total. Although the content is preferable to be as much as possible when only the properties are considered, because the cost for adding alloys increases, 1% or less in total is preferable. Also, because there is an action of largely increasing the strength of austenite, the load of hot rolling increases, manufacturing of the steel sheet becomes difficult, and therefore 1% or less is preferable from the viewpoint of manufacturability also. More preferable lower limit of these elements in total is 0.05% or more (more preferably 0.06% or more), and more preferable upper limit in total is 0.9% or less (more preferably 0.8% or less).

(V and/or Nb: 0.1% or less (exclusive of 0%) in total)

V and Nb have effects of forming fine carbide and miniaturizing the structure by a pinning effect. In order to exert such effects, it is preferable to contain them by 0.001% or more in total. However, when the content of these elements becomes excessive, coarse carbide is formed and becomes a start point of breakage, ductility is deteriorated adversely, and therefore 0.1% or less in total is preferable. More preferable lower limit of the content of these elements in total is 0.005% or more (more preferably 0.008% or more), and more preferable upper limit in total is 0.08% or less (more preferably 0.06% or less).

According to the present invention, by properly adjusting the press forming condition (the heating temperature and the cooling rate according to each steel sheet region), the properties of the strength, elongation and the like of each forming region in the formed product can be controlled, the hot-press formed product with high ductility (residual ductility) is obtained, and therefore application also to portions to which the conventional hot-press formed products have been hard to apply (for example, a member where both of the shock resistant properties and the energy absorption suppression are required) becomes possible which is very useful in expanding the application range of the hot-press formed product. Also, with respect to the formed product obtained by the present invention, the residual ductility further increases compared to the formed product in which ordinary annealing is subjected to after cold-press forming and the structure is adjusted.

Although the effect of the present invention will be shown below more specifically by examples, the examples described below do not limit the present invention, and any of the design alterations judging from the purposes described above and below is to be included in the technical range of the present invention.

The present application is to claim the benefit of the claims based on Japanese Patent Application No. 2012-59448 applied on Mar. 15, 2012. All contents of the description of Japanese Patent Application No. 2012-59448 applied on Mar. 15, 2012 are to be cited in the present application for reference.

EXAMPLES

Steel having the chemical component composition shown in Table 1 below was molten in vacuum, was made a slab for experiment, was thereafter hot-rolled, and thereafter cooled and wound. Further, cold-rolling was performed and a thin steel sheet was obtained. Also, $Ac_1$ transformation point, $Ac_3$ transformation point, and Ms point in Table 1 were obtained using expressions (1)-(3) below (refer to "The Physical Metallurgy of Steels", Leslie, Maruzen Company, Limited (1985) for example). Furthermore, in Table 1, the calculated value of (Ac$_1$ transformation point×0.2+Ac$_3$ transformation point×0.8) (hereinafter referred to as "A value" was also shown.

Ac$_1$ transformation point (° C.)=723+29.1×[Si]−10.7×[Mn]+16.9×[Cr]−16.9×[Ni]  (1)

Ac$_3$ transformation point (° C.)=910−203×[C]$^{1/2}$+44.7×[Si]−30×[Mn]+700×[P]+400×[Al]+400×[Ti]+104×[V]−11×[Cr]+31.5×[Mo]−20×[Cu]−15.2×[Ni]  (2)

Ms point (° C.)=550−361×[C]−39×[Mn]−10×[Cu]−17×[Ni]−20×[Cr]−5×[Mo]+30×[Al]  (3)

wherein [C], [Si], [Mn], [P], [Al], [Ti], [V], [Cr], [Mo], [Cu] and [Ni] represent the content (mass %) of C, Si, Mn, P, Al, Ti, V, Cr, Mo, Cu and Ni respectively. Also, when the element shown in each term of the expressions (1)-(3) above is not contained, calculation is done assuming that the term is null.

(Tensile Strength (TS) and Elongation (Total Elongation (EL))

The tensile test was executed using a JIS No. 5 specimen, and the tensile strength (TS) and the elongation (EL) were measured. At this time, the strain rate of the tensile test was made 10 mm/s. In the present invention, the case (a) 1,470 MPa or more of the tensile strength (TS) and 10% or more of the elongation (EL) were satisfied in the first steel sheet region and (b) 980 MPa or more of the tensile strength (TS) and 15% or more of the elongation (EL) were satisfied in the second steel sheet region at the same time was evaluated to have passed.

(Observation of Metal Structure (Fraction of Each Structure))

(1) With respect to the structure of martensite, annealed martensite, bainite, and annealed bainite in the steel sheet, the steel was corroded by nital, martensite, annealed martensite, bainite, and annealed bainite were distinguished

TABLE 1

| Steel kind | Chemical component composition* (mass %) | | | | | | | | | Ac$_1$ transformation point | Ac$_3$ transformation point | A value | Ms point (° C.) |
| --- | --- | --- | --- | --- | --- | --- | --- | --- | --- | --- | --- | --- | --- |
| | C | Si | Mn | P | S | Cr | Al | Ti | B | N | | | | |
| A | 0.232 | 1.19 | 1.41 | 0.014 | 0.0021 | 0.21 | 0.053 | 0.027 | 0.0033 | 0.0047 | 746 | 863 | 840 | 409 |
| B | 0.232 | 0.18 | 1.41 | 0.014 | 0.0021 | 0.21 | 0.053 | 0.027 | 0.0033 | 0.0047 | 717 | 817 | 797 | 409 |

*The remainder: iron and inevitable impurities other than P, S, N.

Figure 2:
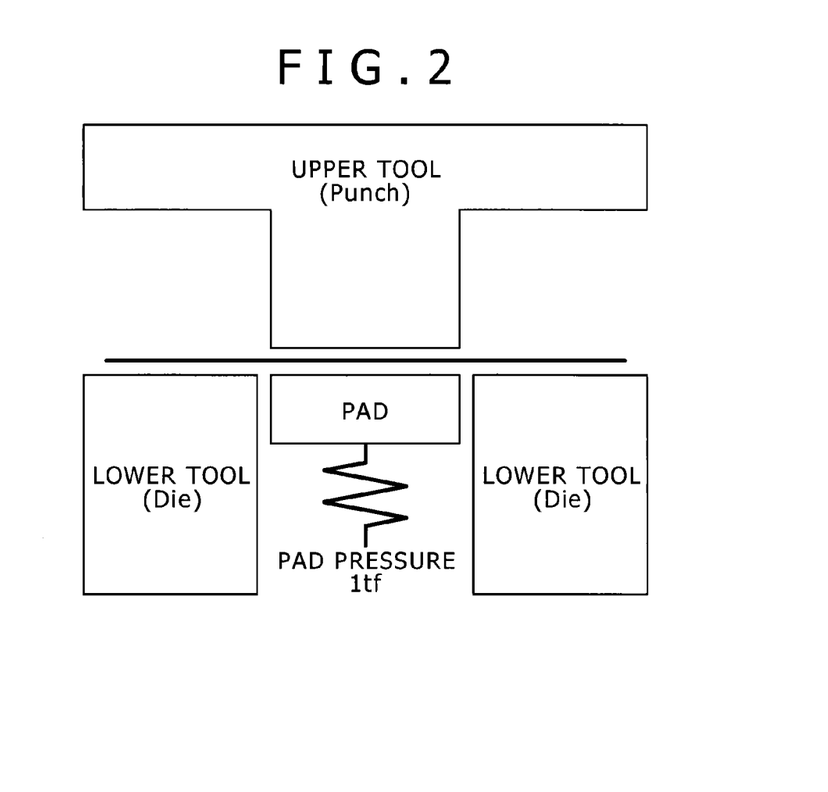
FIG. 2 is a schematic explanatory drawing of a forming tool used in the example.
Figure 3:
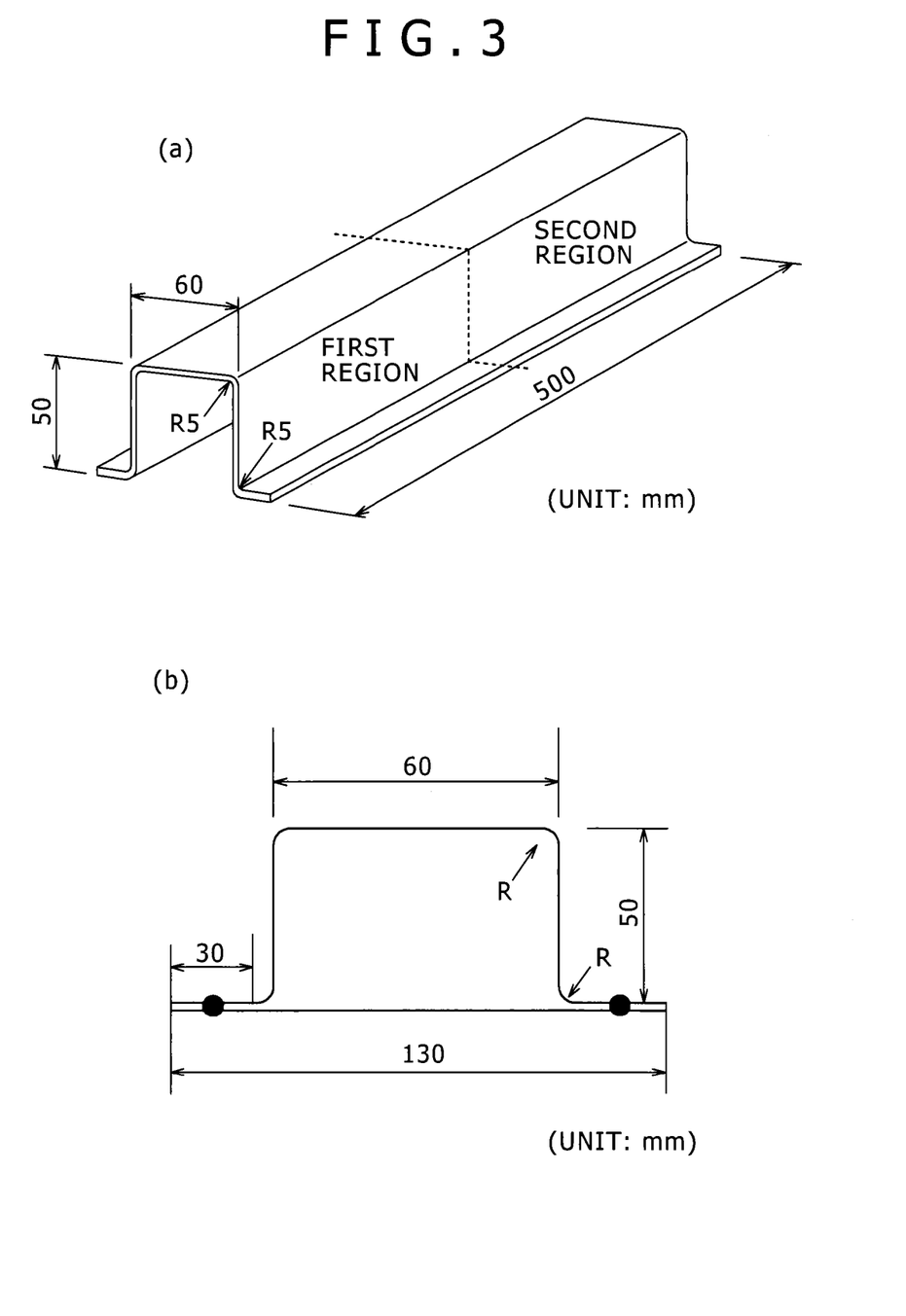
FIG. 3 is a schematic explanatory drawing showing a shape of a press formed product formed in the example.

The steel sheet obtained was subjected to a forming/cooling treatment changing the heating temperature in each steel sheet region. More specifically, press forming was executed using a bending forming tool of a hat (hat channel) shape shown in FIG. 2. The heating temperature and the average cooling rate in each steel sheet region are shown in Table 2 below (the forming finishing temperature (tool releasing temperature) is 200° C. for all regions). The steel sheet size in forming/cooling was made 220 mm×500 mm (sheet thickness: 1.4 mm) (the area ratio of the first steel sheet region and the second steel sheet region is 1:1). The shape of the press-formed product formed is shown in FIG. 3 (FIG. 3(a) is a perspective view, and FIG. 3(b) is a cross-sectional view).

from each other by SEM observation (magnifications: 1,000 times or 2,000 times), and each fraction (area ratio) was obtained.

(2) The retained austenite fraction (area ratio) in the steel sheet was measured by X-ray diffraction method after the steel sheet was ground up to ¼ thickness of the steel sheet and was thereafter subjected to chemical polishing (for example, ISJJ Int. Vol. 33. (1933), No. 7, P. 776).

(3) With respect to the area ratio of martensite (martensite as quenched), the steel sheet was LePera-corroded, the area ratio of the white contrast was measured by SEM observation as the mixture structure of martensite (martensite as quenched) and retained austenite, the retained austenite fraction obtained by X-ray diffraction was deducted there-

TABLE 2

| | | Manufacturing condition | | | |
| --- | --- | --- | --- | --- | --- |
| | Steel sheet initial structure (area %) | | First steel sheet region | | Second steel sheet region | |
| Test No. | Steel kind | Martensite | Bainite | Steel sheet heating temperature (° C.) | Average cooling rate (° C./s) | Steel sheet heating temperature (° C.) | Average cooling rate (° C./s) |
| 1 | A | 100 | — | 930 | 40 | 825 | 40 |
| 2 | A | 100 | — | 930 | 40 | 730 | 40 |
| 3 | B | CR* | | 930 | 40 | 825 | 40 |
| 4 | A | — | 100 | 930 | 40 | 825 | 40 |

*CR: cold rolled steel sheet (ferrite fraction: 60 area %, cold rolling rate: 50%)

With respect to each steel sheet having been subjected to treatments described above (heating, forming, cooling), measurement of the tensile strength (TS) and the elongation (total elongation EL) and observation of the metal structure (the fraction of each structure) were executed by the following procedure.

from, and the fraction of martensite as quenched was calculated.

The measured result of the metal structure in each forming region of the formed product is shown in Table 3 below, and the mechanical properties in each forming region of the formed product are shown in Table 4 below.

TABLE 3

| | | Structure of formed product (area %) | | | | | | |
|---|---|---|---|---|---|---|---|---|
| | | First forming region | | | Second forming region | | | |
| Test No. | Steel kind | Martensite | Retained austenite | Others | Annealed martensite | Annealed bainite | Martensite as quenched | Retained austenite | Others |
| 1 | A | 95 | 5 | — | 45 | 0 | 38 | 7 | 10 (Bainite) |
| 2 | A | 95 | 5 | — | 0 | 0 | 0 | 0 | 100 (Tempered martensite) |
| 3 | B | 100 | 0 | — | 0 | 0 | 28 | 0 | 45 (Ferrite) 27 (Bainitic ferrite) |
| 4 | A | 95 | 5 | — | 0 | 48 | 30 | 6 | 16 (Bainite) |

TABLE 4

| | | Mechanical properties | | | |
|---|---|---|---|---|---|
| | | First forming region | | Second forming region | |
| Test No. | Steel kind | Tensile strength TS (MPa) | Elongation EL (%) | Tensile strength TS (MPa) | Elongation EL (%) |
| 1 | A | 1550 | 10 | 1180 | 16 |
| 2 | A | 1550 | 10 | 610 | 15 |
| 3 | B | 1545 | 7 | 989 | 13 |
| 4 | A | 1550 | 10 | 1010 | 23 |

From these results, the following consideration can be made. Those of the test Nos. 1, 4 are examples satisfying the requirements stipulated in the present invention, and it is known that the formed products in which the strength-ductile balance in each forming region is achieved with high performance have been obtained.

On the other hand, those of the test Nos. 2, 3 are the comparative examples not satisfying any of the requirements stipulated in the present invention, and any of the properties is deteriorated. In other words, that of the test No. 2 has the tempered martensite structure by 100% because of heating to $Ac_1$ transformation point or below in the forming region 2, martensite as quenched is not formed, and the strength is not secured. That of the test No. 3 is objected to the conventional 22Mn—B5-equivalent steel (steel kind B in Table 1), although high strength is obtained, retained austenite is not secured, and only low elongation (EL) is obtained.

INDUSTRIAL APPLICABILITY

The hot-press formed product of the present invention has regions equivalent to a shock resistant portion and an energy absorption portion within a single formed product by including a first forming region exhibiting a metal structure containing martensite: 80-97 area % and retained austenite: 3-20 area % respectively, the remaining structure being 5 area % or less, and a second forming region exhibiting a metal structure including annealed martensite or annealed bainite: 30-97 area %, martensite as quenched: 0-67 area %, and retained austenite: 3-20 area %, and can achieve the balance of high strength and elongation with a high level according to each region.

REFERENCE SIGNS LIST

1 . . . punch
2 . . . die
3 . . . blank holder
4 . . . steel sheet (blank)

The invention claimed is:

1. A hot-press formed steel product, comprising:
a first forming region exhibiting a metal structure containing martensite of 80-97 area %, retained austenite of 3-20 area %, and other structure of 5 area % or less, and
a second forming region exhibiting a metal structure containing annealed martensite or annealed bainite of 30-97 area %, martensite as quenched of 0-67 area %, and retained austenite of 3-20 area %.

2. The hot-press formed steel product according to claim 1, wherein
the first forming region and the second forming region have the same chemical component composition, and steel of each forming region comprises:
C: 0.1-0.3;
Si: 0.5-3 mass %;
Mn: 0.5-2 mass %;
P: 0.05 mass % or less, excluding 0 mass %;
S: 0.05 mass % or less, excluding 0 mass %;
Al: 0.01-0.1 mass %;
N: 0.001-0.01 mass %; and
iron.

3. The hot-press formed steel product according to claim 2, wherein the steel further comprises:
B: 0.01 mass % or less, excluding 0 mass %; and
Ti: 0.1 mass % or less, excluding 0 mass %.

4. The hot-press formed steel product according to claim 2, wherein the steel further comprises:
at least one element selected from the group consisting of Cu, Ni, Cr and Mo in a total amount of 1 mass % or less, excluding 0 mass %.

5. The hot-press formed steel product according to claim 2, wherein the steel further comprises:
at least one of V and Nb in a total amount of 0.1 mass % or less, excluding 0 mass %.

6. A method for manufacturing the hot-press formed steel product according to claim 1, the method comprising:
heating a steel sheet separated into at least two regions and comprising a metal structure having 80 area % or more of martensite or bainite so as to simultaneously execute a plurality of heating treatments including a first heating treatment for heating the first forming region to a temperature of AC3 transformation point or above and 1,000° C. or below and a second heating treatment for heating the second forming region to $Ac_1$ transformation point or above and a temperature equivalent to A or below wherein A=$Ac_1$ transformation point×0.2+$Ac_3$ transformation point×0.8;

thereafter cooling with an average cooling rate of 20° C./s or more and forming by pressing jointly using a tool at least for the first forming region and the second forming region; and finishing forming at a temperature lower than the martensitic transformation starting point Ms by at least 50° C.

7. A method for manufacturing the hot-press formed steel product according to claim 1, the method comprising:

heating a steel sheet separated into at least two regions so as to simultaneously execute a plurality of heating treatments including a first heating treatment for heating the first forming region to a temperature of $Ac_3$ transformation point or above and 1,000° C. or below and a second heating treatment for heating the second forming region to $Ac_1$ transformation point or above and a temperature equivalent to A or below wherein A=$Ac_1$ transformation point×0.2+$Ac_3$ transformation point×0.8;

thereafter cooling with an average cooling rate of 20° C./s or more and forming by pressing jointly using a tool at least for the first forming region and the second forming region; and finishing forming at a temperature lower than the martensitic transformation starting point Ms by at least 50° C.

8. The hot-pressed formed steel product according to claim 1, wherein the first forming region has a tensile strength of 1,470 MPa or more and a total elongation of 10% or more.

9. The hot-pressed formed steel product according to claim 1, wherein the second forming region has a tensile strength of 980 MPa or more and a total elongation of 15% or more.

10. The hot-pressed formed steel product according to claim 2, wherein the steel of each forming region comprises Si: 1.15-3 mass %.

11. The method according to claim 6, wherein, for the first forming region, the cooling comprises a first stage cooling with an average cooling rate of 20° C./s or more to a temperature of (Ms-50)° C. and a subsequent second stage cooling with an average cooling rate of less than 20° C./s to a temperature of 200° C. or below.

12. The method according to claim 6, wherein, for the second forming region, the finish forming is carried out at a temperature of 200° C. or below.

13. The method according to claim 7, wherein, for the first forming region, the cooling comprises a first stage cooling with an average cooling rate of 20° C./s or more to a temperature of (Ms-50)° C. and a subsequent second stage cooling with an average cooling rate of less than 20° C./s to a temperature of 200° C. or below.

14. The method according to claim 7, wherein, for the second forming region, the finish forming is carried out at a temperature of 200° C. or below.

* * * * *